(12) United States Patent
Boddakayala et al.

(10) Patent No.: US 12,126,000 B2
(45) Date of Patent: Oct. 22, 2024

(54) THERMAL BARRIERS FOR TRACTION BATTERY PACK VENTING SYSTEMS AND NEARBY VEHICLE COMPONENTS

(71) Applicant: FORD GLOBAL TECHNOLOGIES, LLC, Dearborn, MI (US)

(72) Inventors: Bhaskara Rao Boddakayala, Troy, MI (US); Di Zhu, Canton, MI (US); Brent Zapczynski, Dearborn, MI (US); Hui Chang, Canton, MI (US); Suriyaprakash A. Janarthanam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 339 days.

(21) Appl. No.: 17/132,369

(22) Filed: Dec. 23, 2020

(65) Prior Publication Data

US 2022/0200079 A1  Jun. 23, 2022

(51) Int. Cl.
*H01M 10/658* (2014.01)
*B60L 50/64* (2019.01)
(Continued)

(52) U.S. Cl.
CPC ........... *H01M 10/658* (2015.04); *B60L 50/64* (2019.02); *H01M 50/249* (2021.01);
(Continued)

(58) Field of Classification Search
CPC .. H01M 10/658; H01M 50/249; H01M 50/35; H01M 50/383; H01M 2220/20; H01M 10/625; H01M 50/358; H01M 50/375; H01M 10/613; H01M 10/6563; B60L 50/64; B60L 2270/12; B60L 50/66;
(Continued)

(56) References Cited

U.S. PATENT DOCUMENTS 8,652,666 B2   2/2014 Kim
10,622,609 B2  4/2020 Ichikawa et al.
(Continued)

FOREIGN PATENT DOCUMENTS

| CN | 111668408 B | * | 9/2020 | .............. H01M 2/10 |
| DE | 102013225564 A1 | | 6/2015 | |
| DE | 102018211233 A1 | | 1/2020 | |

OTHER PUBLICATIONS

Machine translation of CN 111668408B, Peng et al. (Year: 2020).*

*Primary Examiner* — Wyatt P McConnell
(74) *Attorney, Agent, or Firm* — David B. Kelley; Carlson, Gaskey & Olds, P.C.

(57) ABSTRACT

This disclosure details exemplary traction battery pack venting systems for use in electrified vehicles. An exemplary traction battery pack system may include a venting system having one or more vent ducts for expelling battery vent byproducts from a battery pack. The vent ducts may include a thermal barrier configured to block heat emitted by the battery vent byproducts during cell venting events. In some embodiments, the thermal barrier includes a thermal barrier coating. In other embodiments, the thermal barrier includes both a thermal barrier coating and a thermal barrier layer. In still other embodiments, a second thermal barrier may be applied to vehicle components located near the battery pack for improving the thermal barrier properties.

9 Claims, 5 Drawing Sheets

(51) Int. Cl.
  *H01M 50/249* (2021.01)
  *H01M 50/35* (2021.01)
  *H01M 50/383* (2021.01)

(52) U.S. Cl.
  CPC ......... *H01M 50/35* (2021.01); *H01M 50/383* (2021.01); *H01M 2220/20* (2013.01)

(58) Field of Classification Search
  CPC ........ B60L 58/26; B60L 3/0046; Y02E 60/10; Y02T 10/70
  See application file for complete search history.

(56) References Cited

U.S. PATENT DOCUMENTS

| | | | |
|---|---|---|---|
| 2007/0197686 A1* | 8/2007 | Dimanshteyn | C09D 5/18 523/179 |
| 2007/0251595 A1* | 11/2007 | Chen | D04B 1/14 139/420 C |
| 2011/0136937 A1* | 6/2011 | Wierzbicki | C09K 21/02 523/179 |
| 2015/0069068 A1* | 3/2015 | Hariram | H01M 50/271 220/560.01 |
| 2020/0152941 A1* | 5/2020 | Wynn | H01M 10/0422 |
| 2021/0288374 A1* | 9/2021 | Persson | H01M 50/358 |
| 2022/0089503 A1* | 3/2022 | Ren | C04B 38/10 |
| 2022/0181715 A1* | 6/2022 | Jiang | B32B 9/046 |

* cited by examiner

THERMAL BARRIERS FOR TRACTION BATTERY PACK VENTING SYSTEMS AND NEARBY VEHICLE COMPONENTS

TECHNICAL FIELD

This disclosure relates generally to electrified vehicle traction battery packs, and more particularly to thermal barriers for traction battery pack systems.

BACKGROUND

Electrified vehicles are being developed that reduce or completely eliminate reliance on internal combustion engines. In general, electrified vehicles differ from conventional motor vehicles because they are selectively driven by traction battery powered electric machines. Conventional motor vehicles, by contrast, rely exclusively on the internal combustion engine to propel the vehicle.

A high voltage traction battery pack typically powers the electric machines and other electrical loads of the electrified vehicle. The traction battery pack includes a plurality of battery cells and various other battery internal components that support electric propulsion of a vehicle. Battery vent byproducts may be expelled from the battery cells during certain conditions.

SUMMARY

A traction battery pack system according to an exemplary aspect of the present disclosure includes, among other things, a battery pack including a battery cell, a vent duct configured for routing and expelling battery vent byproducts vented by the battery cell to a location external to the battery pack, and a thermal barrier disposed on a surface of the vent duct and configured to block heat emitted by the battery vent byproducts.

In a further non-limiting embodiment of the foregoing traction battery pack system, the surface is an inner surface of the vent duct, an outer surface of the vent duct, or both.

In a further non-limiting embodiment of either of the foregoing traction battery pack systems, the vent duct includes a substrate, and the thermal barrier is disposed on the substrate.

In a further non-limiting embodiment of any of the foregoing traction battery pack systems, the substrate is metallic.

In a further non-limiting embodiment of any of the foregoing traction battery pack systems, the substrate is polymeric.

In a further non-limiting embodiment of any of the foregoing traction battery pack systems, the thermal barrier includes a intumescent fireproof thermal barrier coating.

In a further non-limiting embodiment of any of the foregoing traction battery pack systems, the thermal barrier includes a thermal barrier layer attached to the intumescent fireproof thermal barrier coating.

In a further non-limiting embodiment of any of the foregoing traction battery pack systems, the thermal barrier layer includes a fabric layer, a foam layer, or combinations thereof.

In a further non-limiting embodiment of any of the foregoing traction battery pack systems, a vehicle component is positioned adjacent to the vent duct.

In a further non-limiting embodiment of any of the foregoing traction battery pack systems, a second thermal barrier is disposed on the vehicle component.

In a further non-limiting embodiment of any of the foregoing traction battery pack systems, the second thermal barrier includes a thermal barrier coating, a thermal barrier layer, or both.

In a further non-limiting embodiment, an electrified vehicle includes a traction battery pack system including a battery pack including a battery cell, a vent duct configured for routing and expelling battery vent byproducts vented by the battery cell to a location external to the battery pack, and a thermal barrier disposed on a surface of the vent duct and configured to block heat emitted by the battery vent byproducts.

A traction battery pack system according to another exemplary aspect of the present disclosure includes, among other things, a battery pack, a venting system configured for routing and expelling battery vent byproducts from an interior of the battery pack to a location external to the battery pack, a vehicle component positioned adjacent to the battery pack or the venting system, a first thermal barrier disposed on a portion of the venting system, and a second thermal barrier disposed on a portion of the vehicle component.

In a further non-limiting embodiment of the foregoing traction battery pack system, the first thermal barrier is disposed on an inner surface of a vent duct of the venting system, an outer surface of the vent duct, or both, and further wherein the second thermal barrier is disposed on an outer surface of the vehicle component.

In a further non-limiting embodiment of either of the foregoing traction battery pack systems, the first thermal barrier and the second thermal barrier each includes a thermal barrier coating, a thermal barrier layer, or both.

In a further non-limiting embodiment of any of the foregoing traction battery pack systems, the thermal barrier coating includes an intumescent fireproof coating.

In a further non-limiting embodiment of any of the foregoing traction battery pack systems, the thermal barrier layer includes a fabric layer, a foam layer, or combinations thereof.

In a further non-limiting embodiment of any of the foregoing traction battery pack systems, the fabric layer includes basalt fibers, ceramic fibers, or combinations thereof, and the foam layer includes melamine foam, aerogel foam, or mica slip plane insulation materials.

In a further non-limiting embodiment of any of the foregoing traction battery pack systems, a third thermal barrier is disposed on a portion of the battery pack.

A method according to another exemplary aspect of the present disclosure includes, among other things, applying a thermal barrier to a surface of a vent duct of a traction battery pack venting system, and blocking heat emitted by battery vent byproducts with the thermal barrier during battery cell venting events.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack venting systems for use in electrified vehicles. An exemplary traction battery pack system may include a venting system having one or more vent ducts for expelling battery vent byproducts from a battery pack. The vent ducts may include a thermal barrier configured to block heat emitted by the battery vent byproducts during cell venting events. In some embodiments, the thermal barrier includes a thermal barrier coating. In other embodiments, the thermal barrier includes both a thermal barrier coating and a thermal barrier layer. In still other embodiments, a second thermal barrier may be applied to vehicle components located near the battery pack for improving the thermal barrier properties. These and other features are discussed in greater detail in the following paragraphs of this detailed description.

Figure 1:
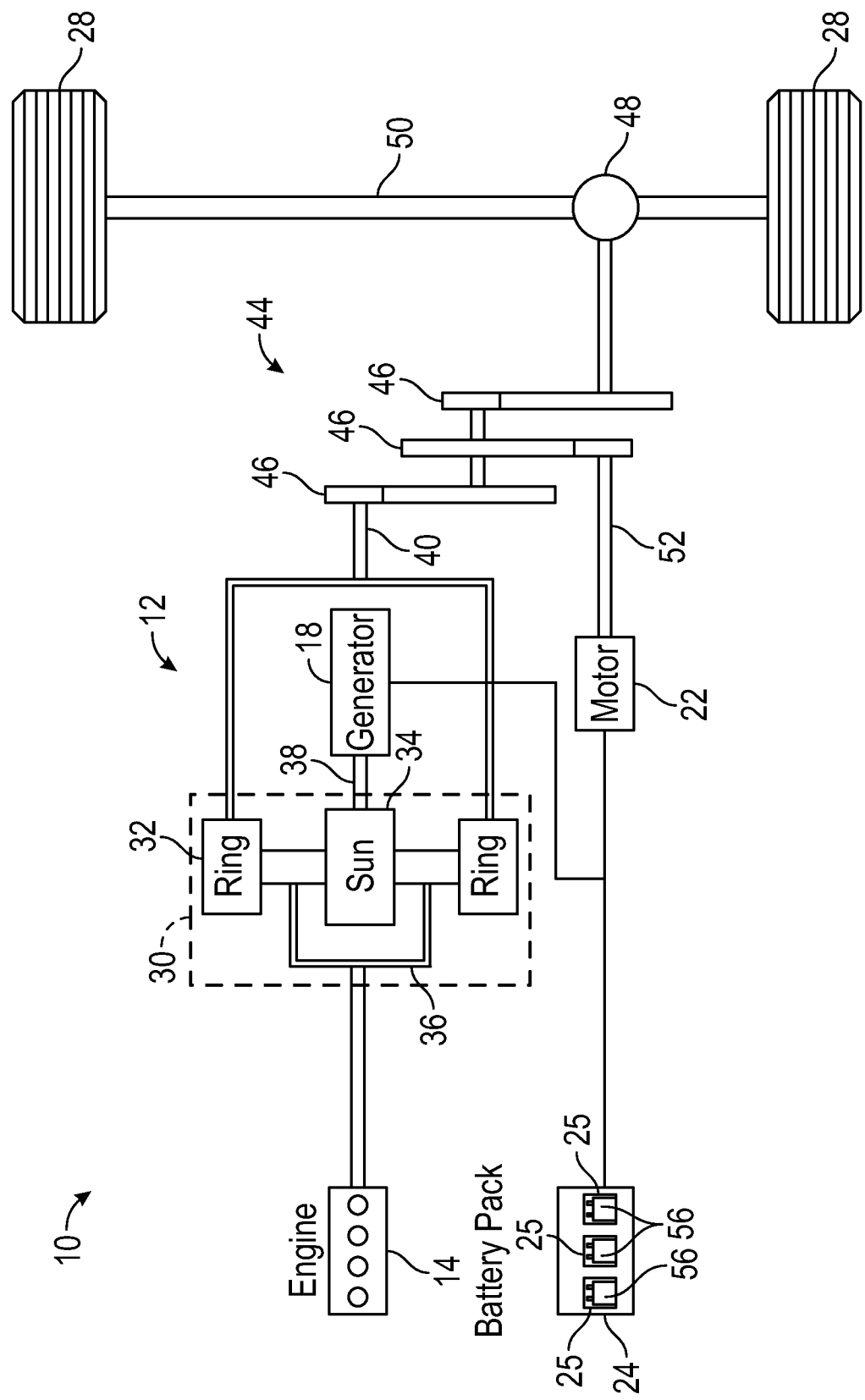
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

Figure 2:
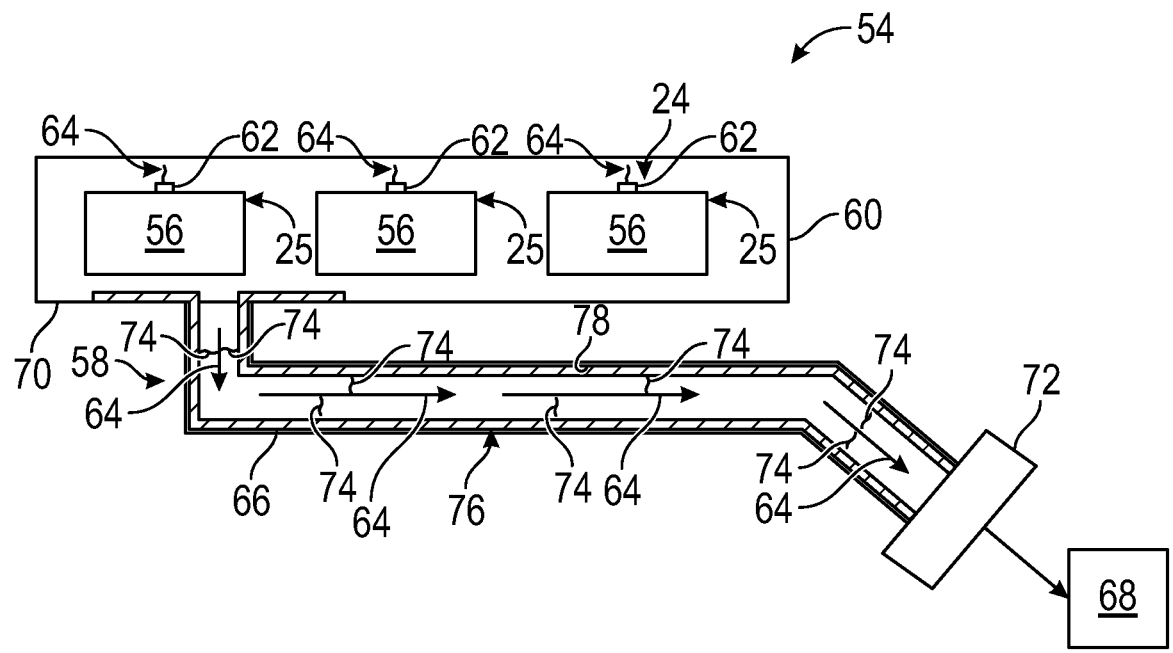
FIG. 2 illustrates a traction battery pack system of an electrified vehicle.

FIG. 2 illustrates a traction battery pack system 54 that can be employed within an electrified vehicle. For example, the traction battery pack system 54 could be incorporated as part of the powertrain 10 of the electrified vehicle 12 of FIG. 1, or within any other electrified powertrain.

The traction battery pack system 54 may include the battery pack 24 and a venting system 58. The battery pack 24 includes a plurality of battery cells 56 that store energy for powering various electrical loads of the electrified vehicle 12. The battery pack 24 could include any number of battery cells within the scope of this disclosure. Therefore, this disclosure is not limited to the exact battery pack configuration shown in FIG. 2. The battery cells 56 may be stacked side-by-side to construct a grouping of battery cells 56, sometimes referred to as a battery array. In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56 may be arranged in one or more battery arrays 25 inside the battery pack 24. Multiple battery arrays 25 are schematically illustrated in FIG. 2, however, the battery pack 24 could include a greater or fewer number of battery arrays than shown and still fall within the scope of this disclosure.

The battery arrays 25, along with various other battery electronic components, may be housed inside an enclosure 60 of the battery pack 24. The enclosure 60 may be a sealed enclosure and may embody any size, shape, and configuration within the scope of this disclosure. For example, the enclosure 60 could be rectangular, triangular, round, irregular, etc. The enclosure 60 may be constructed of metallic materials, polymer-based materials, textile materials, or any combination of these materials.

Each battery cell 56 of the battery pack 24 may include one or more vent ports 62. The vent ports 62 are configured to expel battery vent byproducts 64, such as gases or other byproducts, from the battery cells 56 during certain battery venting events. For example, battery venting events may occur during over-temperature, over-charging, or over-discharging conditions of the battery cells 56, or during other cell conditions.

The venting system 58 of the traction battery pack system 54 is configured for routing and discharging the battery vent byproducts 64 from the interior of the battery pack 24 to a location external to the battery pack 24 while preventing environmental elements (e.g., air, moisture, insects, etc.) from entering the battery pack 24 through the venting system 58. The venting system 58 thereby reduces or prevents thermal expansion and significant pressure increases inside the battery pack 24.

The venting system 58 may include one or more vent ducts 66 arranged for collecting and routing the battery vent byproducts 64 along a venting pathway away from the interior of the battery pack 24. The battery vent byproducts 64 may flow, under their own motive pressure, through each vent duct 66 prior to being expelled outside of the battery pack 24, such as to atmosphere 68 (i.e., outside the vehicle).

In an embodiment, each vent duct 66 is arranged to extend through a wall 70 of the enclosure 60 and is thus in fluid communication with the interior of the battery pack 24. The wall 70 may be any wall of the enclosure 60, including but not limited to a side wall, a bottom wall, a top wall, etc.

Each vent duct 66 of the venting system 58 may be integrated with the wall 70 of the enclosure 60 of the battery pack 24. In an embodiment, the vent duct 66 is welded to the wall 70. In another embodiment, the vent duct 66 is adhesively bonded to the wall 70. In yet another embodiment, the vent duct 66 is integrally formed (e.g., over-molded) with the wall 70, such as for polymer based enclosures, for example.

Each vent duct 66 may further be made up of one or more duct sections. The overall size, shape, and configuration of the vent duct 66 is not intended to limit this disclosure.

The vent duct 66 may be connected to a vent device 72 at a location external to the battery pack 24. The vent device 72 permits the battery vent byproducts 64 to flow out of the battery pack 24 to the atmosphere 68. In an embodiment, the vent device 72 is a one-way valve that is configured to block environmental elements from being communicated along a reverse path from the atmosphere 68 into the vent duct 66. Moisture/humidity of the atmospheric air, insects and other elements associated with the atmosphere 68 are undesirable inside the battery pack 24 and may thus be blocked from ingress by the vent device 72.

In some instances, the battery vent byproducts 64 that are emitted from the vent ports 62 of the battery cells 56 have relatively high temperatures and thus can emit heat 74. This may result in an increase in temperature at the surfaces of each vent duct 66. In this regard, the vent duct 66 may include a thermal barrier 76 that facilitates blocking the heat 74 in order to maintain the surfaces of the vent duct 66 and/or surrounding components (e.g., the battery pack 24) at lower temperatures.

Figure 3:
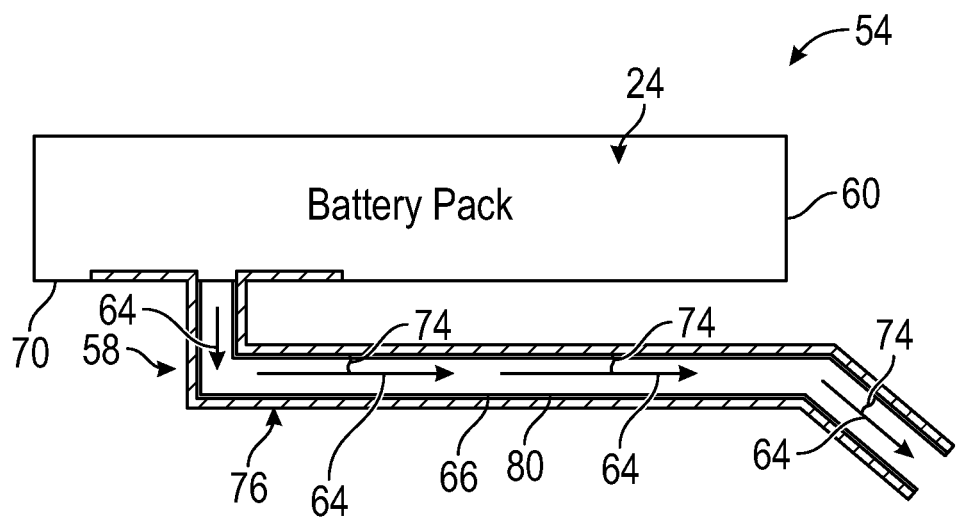
FIG. 3 illustrates another traction battery pack system.
Figure 4:
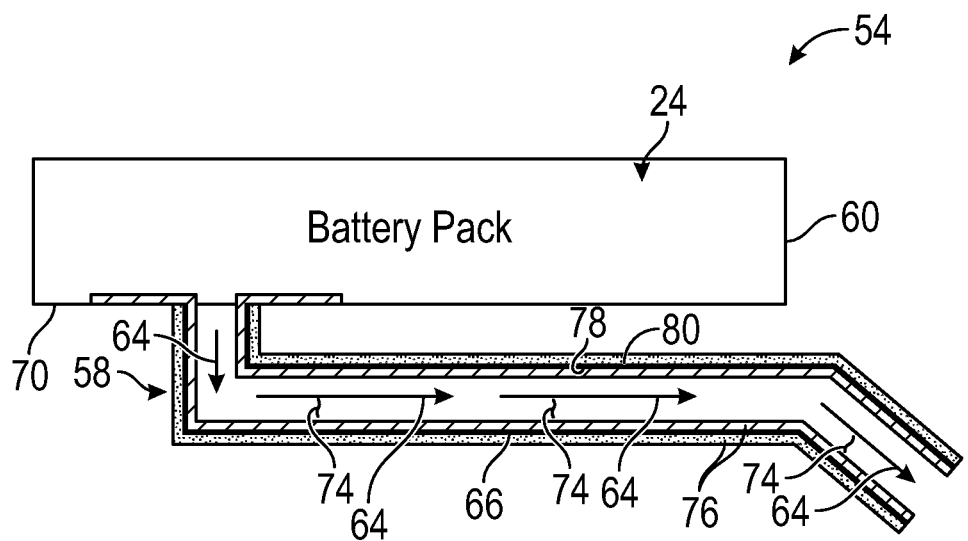
FIG. 4 illustrates yet another traction battery pack system.

In an embodiment, the thermal barrier 76 is disposed at an inner surface 78 of the vent duct 66 (see FIG. 2). In another embodiment, the thermal barrier 76 is disposed at an outer surface 80 of the vent duct 66 (see FIG. 3). In yet another embodiment, the thermal barrier 76 is disposed at both the inner surface 78 and the outer surface 80 of the vent duct 66 (see FIG. 4).

Figure 5:
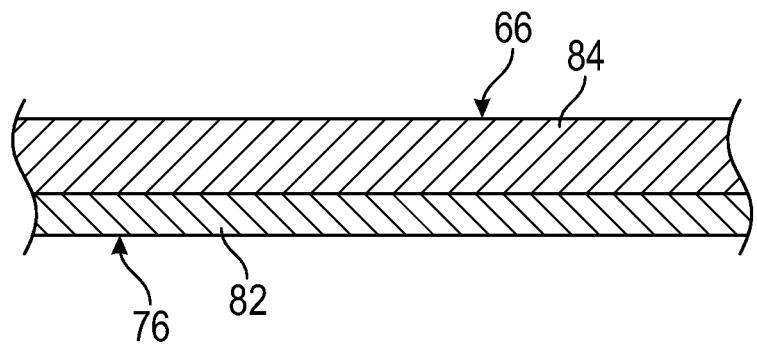
FIG. 5 illustrates an exemplary thermal barrier of a traction battery pack system.

Referring to FIG. 5, the thermal barrier 76 may include a thermal barrier coating 82. The thermal barrier coating 82 is disposed on the surfaces of the vent duct 66, which thereby serves as a substrate 84. The thermal barrier coating 82 may cover selected portions of the vent duct 66, such as portions that are adjacent to hot spots, or entirely cover the inner and/or outer surfaces of the vent duct 66. The substrate 84 may be made of either metallic materials or polymeric materials.

In an embodiment, the thermal barrier coating 82 is an intumescent fireproof coating that includes inorganic materials. The thermal barrier coating 82 may be a silicate-based thermal barrier coating having low thermal conductivity so as to serve as a thermal insulator. The term "silicate-based" indicates that silicate is, by weight, the most abundant constituent in the thermal barrier coating 82. As an example, the thermal barrier coating 82 is comprised of silicate, thermal barrier particles, and non-ionic surfactant. Examples of the thermal barrier particles include kaolin, ceramic, graphite, and combinations thereof. Examples of the non-ionic surfactant include 0.09%-0.15% by weight. For instance, the thermal barrier coating 82 has, by weight, 35-45% of sodium silicate, 1-3% of thermal barrier particles, and 0.09%-0.15% of non-ionic surfactant. In an embodiment, the thermal barrier coating 82 has, by weight, 0.9% kaolin, 0.1% non-ionic surfactant, and a remainder of sodium silicate with deionized water. The silicate-based thermal barrier coating 82 is highly heat resistant, but also has good chemical and corrosion resistance, is moisture repellant, is sulfur-free, and does not promote corrosion.

Other thermal barrier coatings may also be suitable within the scope of this disclosure. Therefore, the thickness and density of the thermal protective coating is not intended to limit this disclosure.

The application of the thermal barrier coating 82 to the substrate 84 is not particularly limited. For example, the thermal barrier coating 82 may be applied by rolling, spraying, or brushing a coating solution that contains the coating constituents onto the substrate 84, followed by curing the coating solution. In an embodiment, the coating solution is thermally cured to remove solvent, such as DI water, and to react coating constituents. For instance, when heated above a reaction temperature, kaolin or other thermal barrier particles react with the silicate to produce a ceramic phase that may further lower the bulk thermal conductivity of the thermal barrier coating 82.

Figure 6:
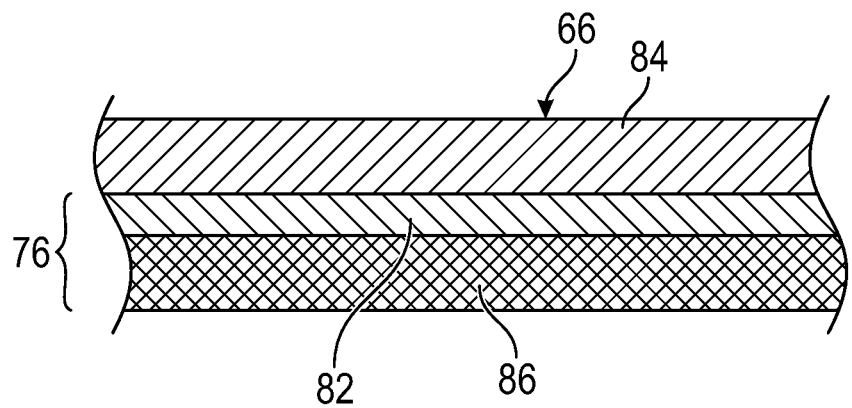
FIG. 6 illustrates another exemplary thermal barrier.

In another embodiment, shown in FIG. 6, the thermal barrier 76 of the vent duct 66 may include the thermal barrier coating 82 and a thermal barrier layer 86 in addition to the thermal barrier coating 82. The thermal barrier layer 86 is attached to the thermal barrier coating 82 and serves to further reduce heat dissipation through the vent duct 66.

The thermal barrier layer 86 is generally pliable so as to be able to conform to contours of the vent duct 66. In an embodiment, the thermal barrier layer 86 is selected from a fabric layer, foam layer, or a combination thereof. Example fabric layers include silicate fiber fabrics and basalt fiber fabrics. Such fabrics may be woven or non-woven. Example foam layers include melamine foam, aerogel foam (e.g., silica or metal oxide), and mica slip plane insulation materials.

The thermal barrier layer 86 may be incorporated during application of the thermal barrier coating 82 onto the substrate 84 by applying the thermal barrier layer 86 on the coating solution prior to full cure. If the thermal barrier layer 86 is porous, the coating solution may at least partially infiltrate the thermal barrier layer 86 and thereby bond it to the substrate 84. Alternatively, an adhesive may be provided between the thermal barrier coating 82 and the thermal barrier layer 86 to bond the thermal barrier layer 86 to the substrate 84.

Figure 7:
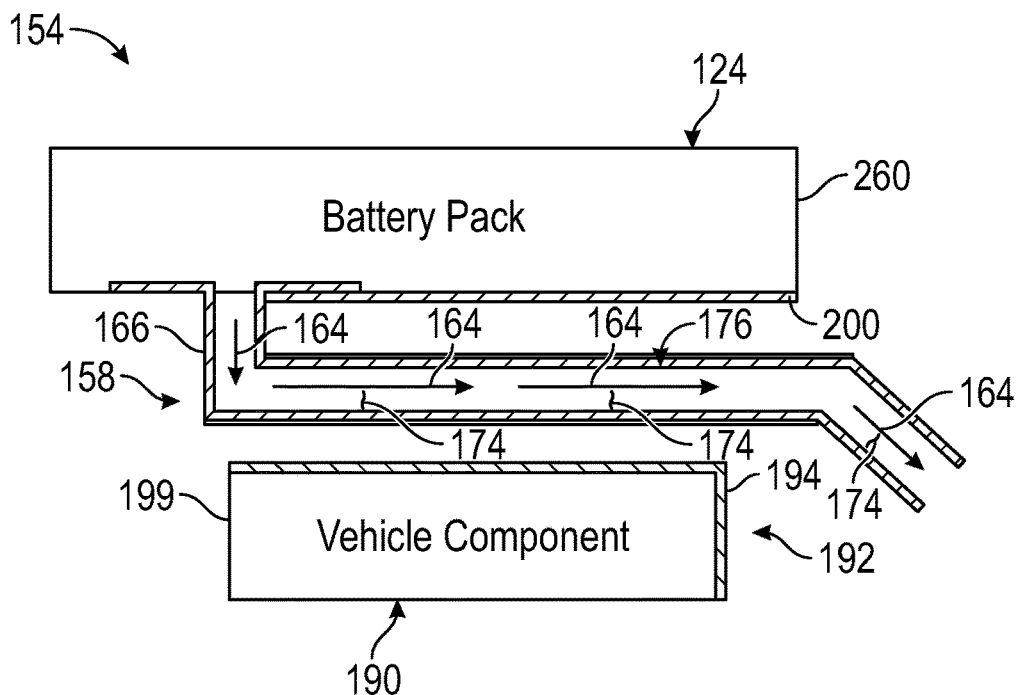
FIG. 7 illustrates another traction battery pack system.

FIG. 7 illustrates another exemplary traction battery pack system 154. The traction battery pack system 154 includes a battery pack 124 and a venting system 158. The venting system 158 may include one or more vent ducts 166 that include a thermal barrier 176. The thermal barrier 176 may be disposed at any of the locations shown in FIGS. 2-4 and may include either of the configurations shown in FIGS. 5-6.

One or more vehicle components 190 may be located near the battery pack 124. The vehicle component 190 could be a fuel tank, an exhaust component, a high voltage connector component, a plastic vehicle component having a relatively low thermal tolerance, or any other vehicle component. In an embodiment, the vehicle component 190 is a component positioned immediately adjacent to the vent duct 166 and thus may be susceptible to heat 174 emitted by the battery vent byproducts 164 during battery cell venting events. This may result in an increase in temperature at the surfaces of the vehicle component 190. In this regard, a second thermal barrier 192 may be applied to the vehicle component 190 for blocking the heat 174 in order to maintain the surfaces of the vehicle component 190 and/or other surrounding components at lower temperatures.

Figure 8:
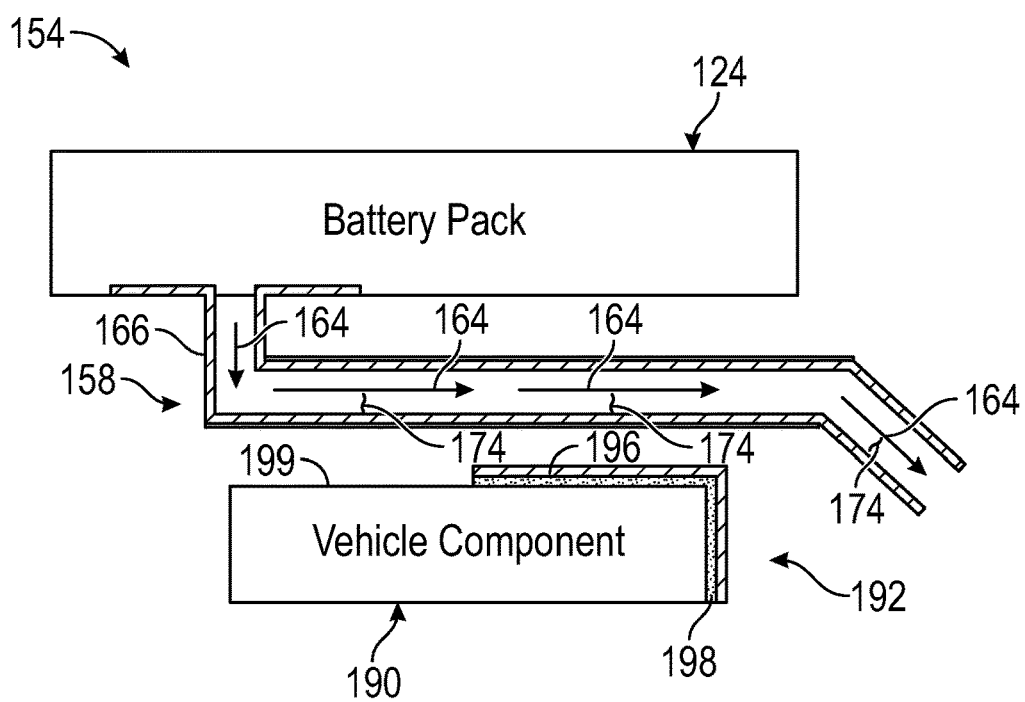
FIG. 8 illustrates another traction battery pack system.
Figure 9:
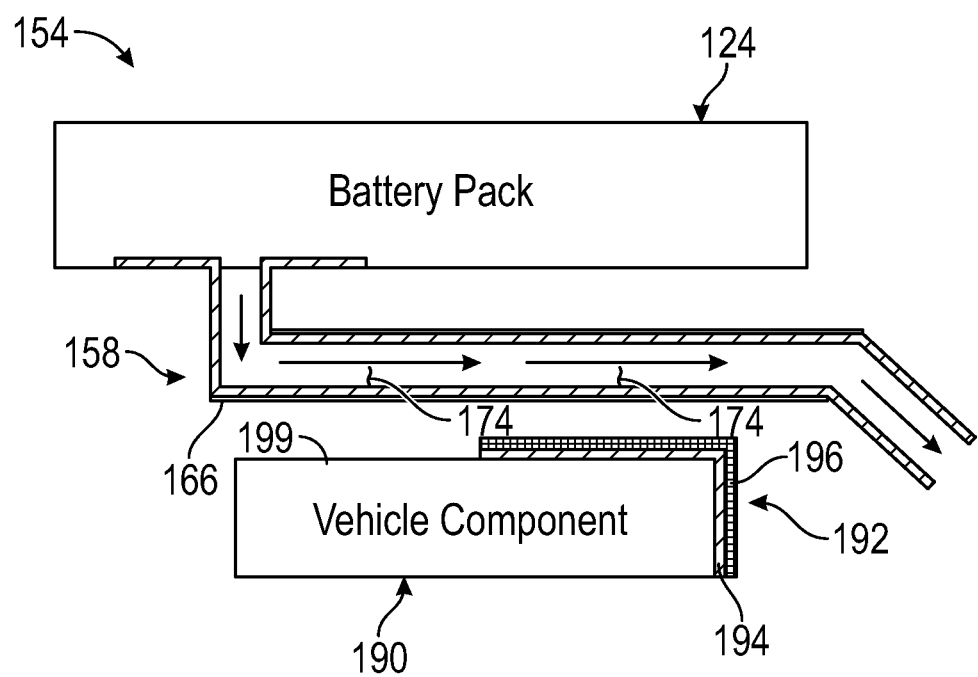
FIG. 9 illustrates yet another traction battery pack system.

The second thermal barrier 192 may include a thermal barrier coating 194. In another embodiment, the second thermal barrier 192 includes a thermal barrier layer 196 that is secured to the vehicle component 190 by an adhesive 198 (see FIG. 8). In yet another embodiment, the second thermal barrier 192 includes both the thermal barrier coating 194 and the thermal barrier layer 196 (see FIG. 9).

The thermal barrier coating 194 and/or the thermal barrier layer 196 may be disposed on an outer surface 199 of the vehicle component 190. The thermal barrier coating 194 may cover selected portions of the outer surface 199, such as portions that are adjacent to hot spots or that face toward the heat source, or may entirely cover the exterior of the vehicle component 190. The thermal barrier coating 194 and the thermal barrier layer 196 may include similar or different material compositions compared to the coatings/layers applied to the vent duct 166.

A third thermal barrier 200 may be applied to portions of the enclosure 260 of the battery pack 124 for blocking the heat 174 in order to maintain the surfaces of the enclosure 260 at lower temperatures. The third thermal barrier 200 may include a thermal barrier coating, a thermal barrier layer, or both.

FIGS. 2-7 are shown schematically and not necessarily drawn to scale. Some features may be exaggerated or minimized to emphasize certain details of a particular component or feature.

The exemplary traction battery pack venting systems of this disclosure incorporate thermal barriers that are designed to absorb high temperatures from vented gases that are released during cell venting events, thereby limiting exposure and any associated performance degradation of nearby components to the high temperatures. The proposed thermal barriers provided increased heat flux, increased thermal insulation, and thus reduced susceptibility to the high temperature exposure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack system, comprising:
    a battery pack including an enclosure that establishes an interior for housing a battery array, the enclosure including a wall that surrounds the interior and establishes an outermost surface of the battery pack;
    a vent duct includes a first duct section that extends through the wall and is in fluid communication with the interior, wherein the vent duct is configured for routing and expelling battery vent byproducts vented by at least one battery cell of the battery array to a location outside the battery pack, wherein the vent duct includes a second duct section that extends on an opposite side of the wall from the interior and is completely outside of the battery pack;
    a thermal barrier disposed on both an inner surface and an outer surface of the second duct section,
    wherein the thermal barrier includes a intumescent fireproof thermal barrier coating and a thermal barrier layer attached to the intumescent fireproof thermal barrier coating,
    wherein the intumescent fireproof thermal barrier coating is a silicate-based thermal barrier coating,
    wherein the thermal barrier layer includes melamine foam, aerogel foam, or mica slip plane insulation materials;
    a one-way valve connected to the second duct section and located on an opposite end of the vent duct from the first duct section;
    a fuel tank located immediately adjacent to the second duct section, wherein the second duct section extends axially between the fuel tank and the wall of the enclosure of the battery pack; and
    a second thermal barrier disposed on an outer surface of the fuel tank.

2. The traction battery pack system as recited in claim 1, wherein the second thermal barrier includes a thermal barrier coating, a thermal barrier layer, or both.

3. The traction battery pack system as recited in claim 1, wherein the thermal barrier layer includes a fabric layer that includes basalt fibers.

4. The traction battery pack system as recited in claim 1, comprising a third thermal barrier disposed on an external surface of the enclosure of the battery pack.

5. The traction battery pack system as recited in claim 1, wherein the intumescent fireproof thermal barrier coating includes, by weight, 35-45% of a sodium silicate, 1-3% of thermal barrier particles, and 0.09%-0.15% of a non-ionic surfactant.

6. The traction battery pack system as recited in claim 1, wherein the intumescent fireproof thermal barrier coating includes, by weight, 0.9% kaolin, 0.1% non-ionic surfactant, and a remainder of sodium silicate with deionized water.

7. The traction battery pack system as recited in claim 1, wherein the vent duct includes a substrate, and the thermal barrier is disposed on the substrate.

8. The traction battery pack system as recited in claim 7, wherein the substrate is metallic.

9. The traction battery pack system as recited in claim 7, wherein the substrate is polymeric.

* * * * *